(12) United States Patent
Lyons et al.

(10) Patent No.: US 6,550,687 B2
(45) Date of Patent: Apr. 22, 2003

(54) HEAT EXCHANGE SYSTEM

(75) Inventors: David Charles Lyons, Red Wing, MN (US); Richard Donald Berg, Lakeville, MN (US); Robb Edward Bennett, Prior Lake, MN (US)

(73) Assignee: HON Technology Inc., Muscatine, IA (US)

( * ) Notice: Subject to any disclaimer, the term of this patent is extended or adjusted under 35 U.S.C. 154(b) by 0 days.

(21) Appl. No.: 09/828,520

(22) Filed: Apr. 6, 2001

(65) Prior Publication Data

US 2001/0042610 A1 Nov. 22, 2001

Related U.S. Application Data

(63) Continuation-in-part of application No. 09/546,138, filed on Apr. 10, 2000.

(51) Int. Cl.[7] ................................................. F24B 7/00
(52) U.S. Cl. ............................................ 237/55; 237/50
(58) Field of Search ........................... 237/50, 53, 55; 126/512, 523, 528, 529, 530

(56) References Cited

U.S. PATENT DOCUMENTS

| | | | |
|---|---|---|---|
| 3,999,710 A | | 12/1976 | Kemmerer |
| 4,112,914 A | * | 9/1978 | Brown ........................ 126/121 |
| 4,126,118 A | * | 11/1978 | Haynes ....................... 126/132 |
| 4,129,114 A | * | 12/1978 | Hiser ......................... 126/122 |
| 4,130,105 A | * | 12/1978 | Melton ..................... 126/110 R |
| 4,141,336 A | | 2/1979 | Fitch |
| 4,143,638 A | * | 3/1979 | Kamstra ..................... 126/121 |
| 4,270,513 A | | 6/1981 | Mitchelson |
| 4,278,126 A | | 7/1981 | Skrzypek |
| 4,319,557 A | | 3/1982 | Sietmann et al. |
| 4,379,447 A | * | 4/1983 | Schott et al. ................ 126/117 |
| 4,928,667 A | * | 5/1990 | Shaw .......................... 126/512 |
| 5,046,481 A | | 9/1991 | Warwick |
| 5,224,650 A | * | 7/1993 | Gozikowski .................. 237/55 |
| 5,267,552 A | | 12/1993 | Squires et al. |
| 5,497,761 A | | 3/1996 | Mayr |
| 5,947,113 A | * | 9/1999 | Beal et al. ................... 126/512 |
| 5,983,890 A | | 11/1999 | Thomas et al. |
| 6,019,099 A | * | 2/2000 | Shimek et al. ............... 126/512 |
| 6,047,695 A | * | 4/2000 | Eberhardt .................... 126/515 |
| 6,053,165 A | | 4/2000 | Butler et al. |
| 6,145,502 A | | 11/2000 | Lyons et al. |

* cited by examiner

Primary Examiner—Derek Boles
(74) Attorney, Agent, or Firm—Merchant & Gould P.C.

(57) ABSTRACT

A heat exchange system and method for heating outside air provided to a structure are disclosed. The system uses and recovers heat from waste products that are being exhausted from the structure. A heated products source generates heated waste products as a result of combustion. An exhaust duct passes the heated waste products through a heat exchanger before exhaustion from the structure. An intake duct that supplies fresh outside air to the structure also passes through the heat exchanger. The heat exchanger couples the exhaust duct and the intake duct and transfers otherwise unused heat from the waste products to the outside air to increase the overall efficiency of the heated product source.

19 Claims, 9 Drawing Sheets

HEAT EXCHANGE SYSTEM

CROSS REFERENCE TO RELATED APPLICATION

This application is a continuation in part application of application Ser. No. 09/546,138 filed Apr. 10, 2000, which application is incorporated by reference herein.

FIELD OF THE INVENTION

This invention relates to heated product sources located within a structure that generate waste products of combustion. In particular, the present invention relates to using a heat exchange system to transfer heat from the waste products of combustion to outside air being supplied to the structure.

BACKGROUND OF THE INVENTION

Many structures, such as residential, commercial and industrial buildings, include gas and electric appliances, such as furnaces, hot water heaters, clothes dryers, stoves, and fireplaces that produce heated products when gas/air mixtures are combusted or heat is generated. The heated products of combustion or generated heat can contain waste products, such as carbon dioxide, carbon monoxide, excess heat, and/or particulates. For example, waste products are produced from heating water in a hot water heater such as carbon dioxide, carbon monoxide, and excess heat. An occupant could die if waste products, such as carbon monoxide, reach too high of levels within the structure. In another example, a gas or electric kitchen stove can generate unwanted heat and smoke to an uncomfortable level, making it desirable to remove the waste products from the structure. Therefore, these waste products have to be removed from the structure to provide a safe breathing environment and comfortable atmosphere for occupants, while allowing make-up air to be delivered back into the structure in proper proportion to meet air quality requirements.

Presently, exhaust systems do not make an efficient use of waste product heat before exhaustion from the structure. The waste products are exhausted with little or no heat exchange with the structural surroundings or cold make-up air that is being brought into the structure. Therefore, the overall efficiency of the appliances is reduced because the waste gases are exhausted from the structure at a temperature greater than the temperature within the structure. The result is a less efficient appliance and increased heating and energy costs.

The present invention addresses the increased costs and decreased efficiency associated with failing to effectively use the heat contained within waste gases generated from heated products sources, such as appliances. The present invention provides a novel heat exchange system that uses the heat of waste exhaust gases to increase the temperature of fresh air as well as increase the overall efficiency of a heated product source that is in use within a structure.

SUMMARY OF THE INVENTION

Generally, the present invention relates to a heat exchange system that uses and removes heat from waste products being generated by a heated product source and exhausted from a structure. The heated exchange system provides a heat exchanger to transfer heat from the waste products to fresh outside air being supplied to the structure.

In one respect, the invention relates to a heat exchange system for heating outside air provided to a structure. The heat exchange system includes an exhaust duct to remove heated waste products generated by a heated products source from the structure. An intake duct supplies outside air to the structure. A heat exchanger couples the exhaust duct and the intake duct to transfer heat from the heated exhaust products to the outside air.

In another respect, the invention relates to a heat exchange system for heating outside air provided to a structure. The heat exchange system includes an exhaust duct to remove heated waste products generated by a heated products source from the structure. An intake duct supplies outside air to a room supply duct of a furnace housed within the structure. A heat exchanger couples the exhaust duct and the intake duct to transfer heat from the heated exhaust products to the outside air. A controller and a pair of in-line blowers are coupled to the heat exchanger to regulate air quality within the structure, wherein the controller independently controls each of the in-line blowers.

In another respect, the invention relates to a heat exchange system for heating outside air provided to a structure that includes a common exhaust duct to remove heated waste products generated by two or more heated products sources from the structure. A heat exchanger couples the common exhaust duct to an intake duct that supplies outside air to the structure. The heat exchanger transfers heat from the heated exhaust products to the outside air.

In another respect, the invention relates to a method heating outside air supplied to a structure including generating heated waste products of combustion, passing the heated waste products into an exhaust duct, conducting the heated combustion products through a heat exchanger, passing outside air into an intake duct and conducting the outside air through the heat exchanger to transfer heat from the heated combustion products to the outside air.

The above summary of the present invention is not intended to describe each disclosed embodiment or every implementation of the present invention. The Figures and the detailed description that follow more particularly exemplify embodiments of the invention. While certain embodiment of the invention will be illustrated in describing embodiments of the invention, the invention is not limited to use in such embodiments.

Figure 1:
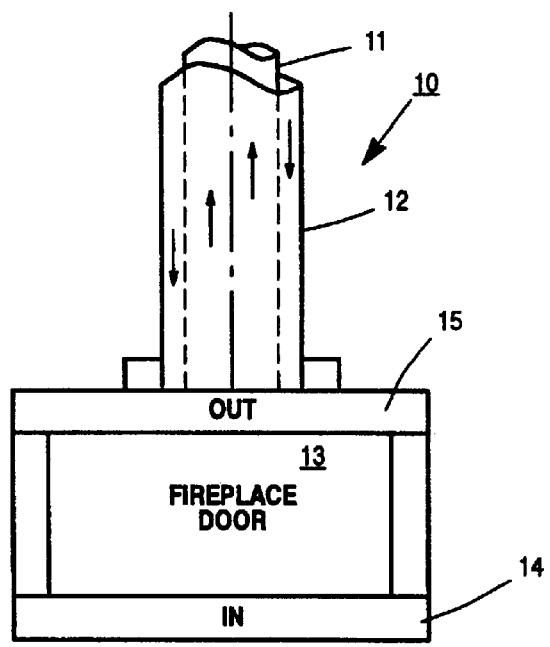
FIG. 1 is a diagrammatic drawing in front elevation of a prior art direct vent fireplace with a convection heat exchanger.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENTS

The invention is applicable to heat exchange systems for use in structures. In particular, the invention is directed to transferring heat from waste combustion products that would otherwise go unused prior to exhaustion from the structure, which increases the overall efficiency of the source of the waste products.

Referring to FIG. 1, a top direct vent fireplace 10 of the type having a coaxial pipe comprising an exhaust pipe 11 and a fresh intake air pipe 12 is shown. The fresh outside air is burned in the center of the fireplace 10 in combustion chamber 13 and subsequently exhausted back out the center exhaust pipe 11 so that no inside air is required for the combustion products. Such gas fireplaces are sold by Heat-N-Glo Fireplace Products, Inc. of Lakeville, Minn. under Model Number 600DVT. Such fireplaces are provided with a heat exchanger which passes under the combustion chamber around the back of the combustion chamber and comes out at the top to provide an efficient convection and radiant heating system. The intake for the heat exchanger is shown at numeral 14 and the outlet of the heat exchanger is shown at numeral 15.

Figure 2:
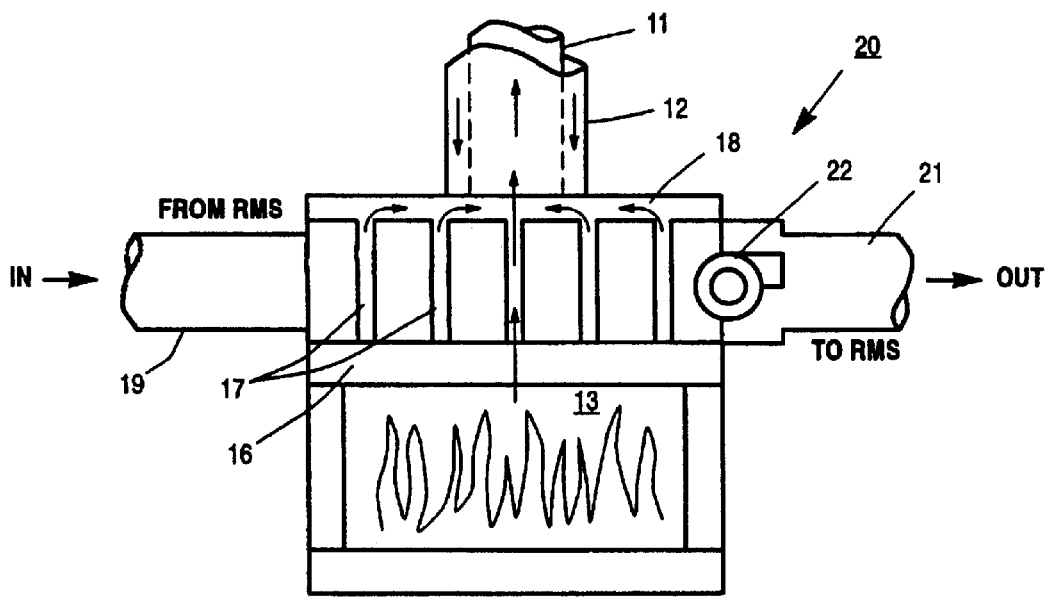
FIG. 2 is a diagrammatic drawing in front elevation of a prior art direct vent fireplace with a fire tube air heat exchanger and a high-speed blower.

Referring to FIG. 2, a front elevation of a direct vent fireplace 20 having an air intake pipe 12 and an exhaust pipe 11 is shown. The combustion gases produced in the combustion chamber 13 are passed into a plenum 16 which connects to fire tubes 17 which exits into an upper plenum 18 and then passes out through the exhaust stack 11. To create a heat exchanger, a supply duct from the room(s) 19 is connected to the heat exchanger box and the air is heated by the hot fire tubes 17 and exits into the hot air return duct 21 with the assistance of an induced/forced draft fan or blower which, by nature of its operation and location, is noisy.

It has been found that consumers who buy prefabricated fireplaces will tolerate low speed quiet blowers in the heat exchangers of the system shown in FIG. 1, but are not quite as tolerant of a noisy high speed blower of the type shown in the prior art fireplace of FIG. 2. Another disadvantage of the FIG. 2 embodiment is that the heat exchanger system is mounted on top of the fireplace 20 and often makes the mantel or top shelf of the fireplace inordinately high and unattractive if it is provided.

Figure 3:
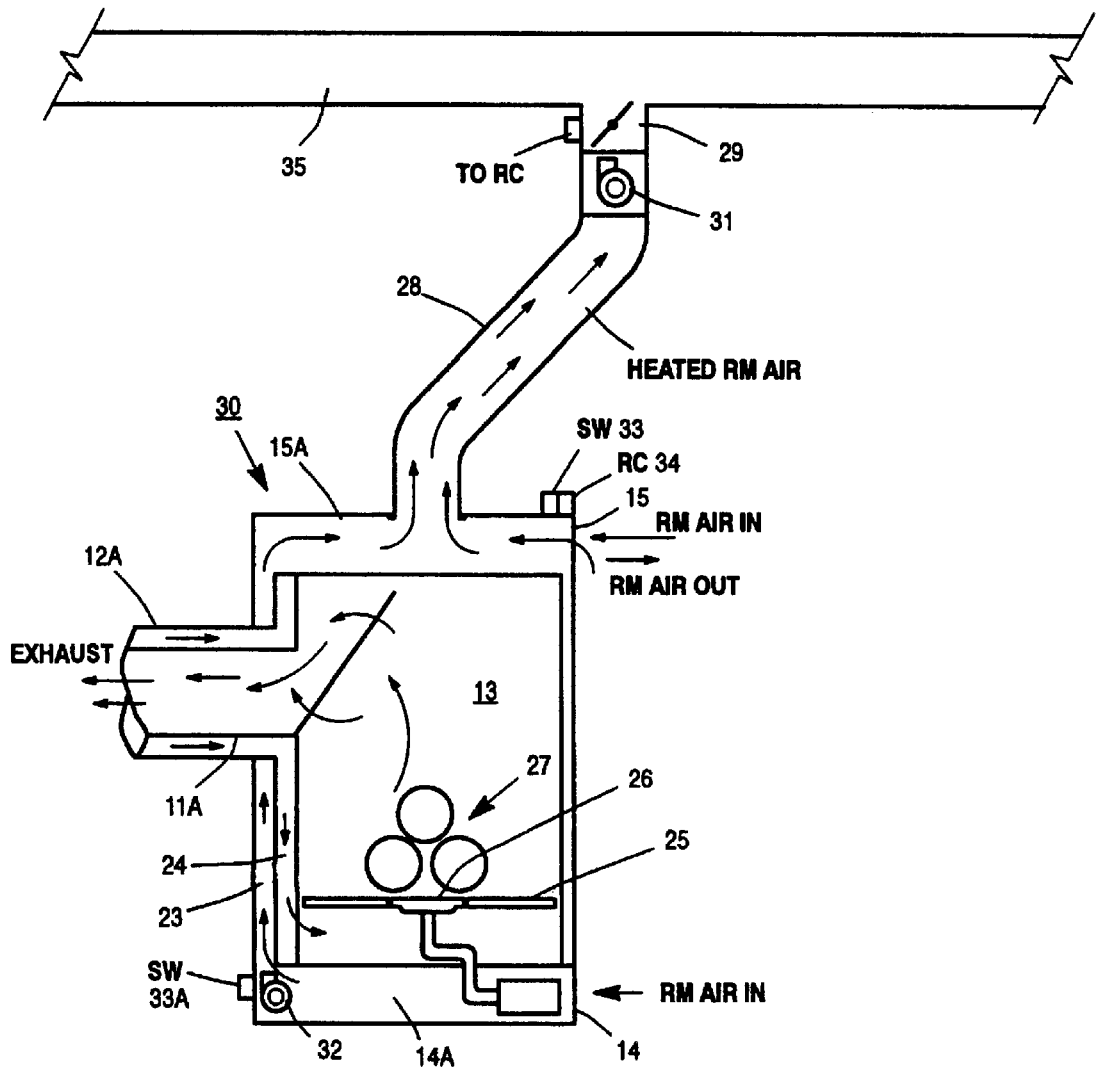
FIG. 3 is a diagrammatic drawing in side elevation of a direct vent fireplace adapted to deliver heat from its heat exchanger to a duct or ducts of a central heating system for distribution to all rooms in a house.

Referring to FIG. 3, a direct vent fireplace 30 is shown adapted to deliver heat from its heat exchanger to a supply duct or return duct of a central heating system for distribution to all rooms or specific rooms in a house. The fireplace 30 is shown comprising an inlet 12A for supplying fresh air into fresh air passage 24 which extends under floor 25 at burner 26 for burning gases in combustion chamber 13 which surround logs 27. In the preferred embodiment, the intake air passage 14 and lower passageway 14A connect into rear heat exchanger passage 23 which connects into upper passageway 15A for supplying heated room air out of the outlet 15.

However, when the system is employed to deliver hot air into duct 28, damper 29 is opened and hot air can be supplied to the return duct 35. In the preferred embodiment of the present invention, when heated room air is being supplied via duct 28 into duct 35 the blower motor 32 is not enabled or activated because the return air duct is capable of pulling the air to the central heating system not shown. In the event that the closest duct available is a supply duct, it is necessary to force the air into the supply duct using a forced draft fan 31.

The advantage of fireplace 30 is that the blower motor 32 is a very quiet low speed motor and is only used when fireplace 30 is used in its conventional mode to take air in inlet 14 and exhaust heated air out outlet 15. In all other modes, the motor 32 may be disabled by switches 33 or 33A. As an alternative, it is possible to connect duct 28 to a direct duct which exits into a remote room having an induced draft fan which is actuated by controller 34. The controller 34 may actuate the remote controller RC and used to actuate the damper 29.

Figure 4:
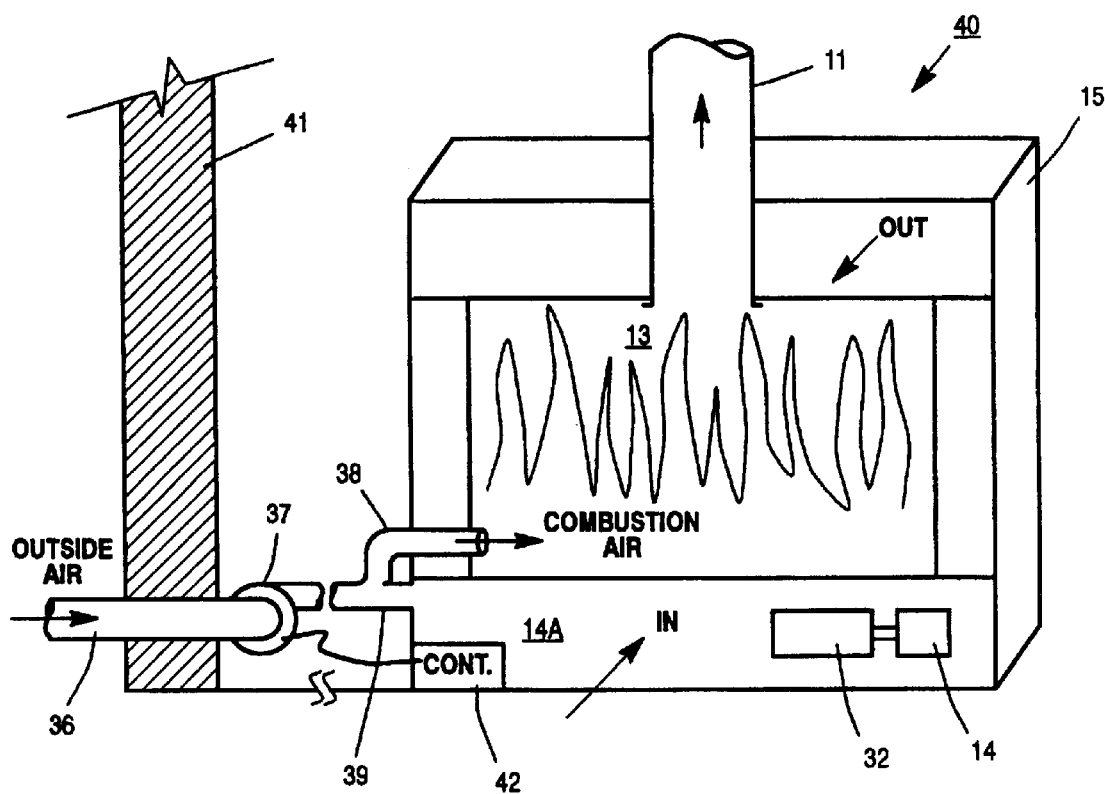
FIG. 4 is a diagrammatic drawing in front elevation of a co-linear fireplace having a quiet blower in its heat exchanger and a remote blower for supplying outside fresh air for combustion as well as excess fresh air to the heat exchanger for supplying fresh make-up air in conformance with new air quality standards.

Referring to FIG. 4 showing a co-linear fireplace 40 having a conventional heat exchanger where the inlets and outlets 14 and 15 are shown and are connected by a passageway like passageway 23, shown in FIG. 3, in the rear of the combustion chamber 13. In this embodiment, a remote blower 37 is shown having an intake pipe 36 connected to an outside source of fresh air which is pumped into the fireplace 40. The necessary amount of combustion air is supplied by supply pipe 38 and the remainder of the outside fresh air which comprises the make-up air is supplied into the heat exchanger by branch 39. Thus, the outside fresh air being forced into the heating system is preheated by the heat exchanger and supplied directly into the same room with the heat exchanger. When the fireplace 40 is of sufficient capacity, all of the outside air is heated above room temperature so that the system operates efficiently to preheat the make-up air as well as supply diluted heated room air to the room in which the fireplace 40 is located. In this embodiment, a control 42 in fireplace 40 operates the remote blower motor 37 at a predetermined speed to supply the necessary make-up air into the chamber shown at inlet 14, 14A.

Figure 5:
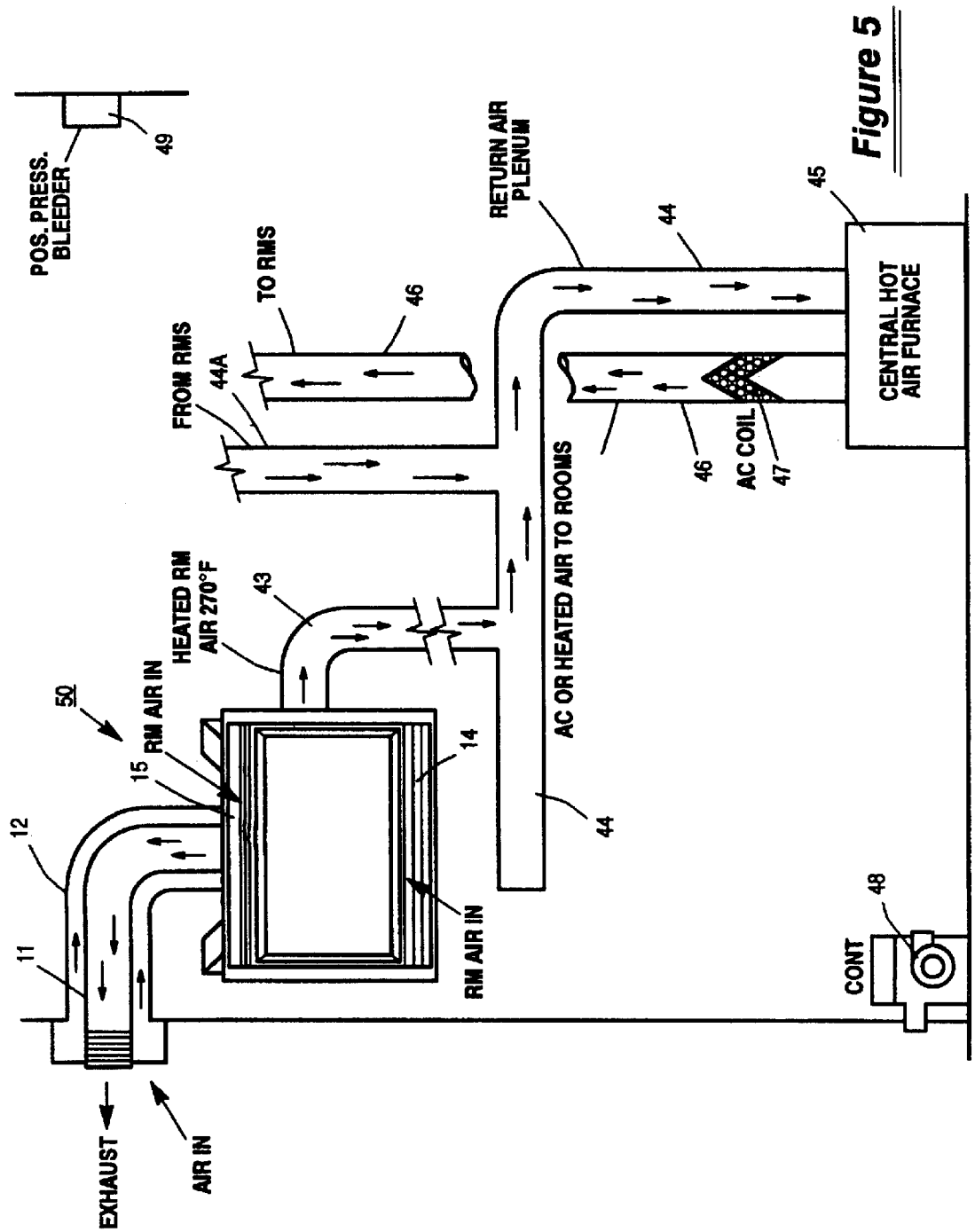
FIG. 5 is a diagrammatic drawing in elevation of a fireplace adapted to heat room air in its heat exchanger and to deliver the heated air into the return air duct of a central heating system and is shown having a remote air pump for supplying a predetermined amount of fresh make-up air to the house.

Referring to FIG. 5, a direct vent fireplace 50 having a supply duct 43 which connects into the heat exchanger of the fireplace 50 is shown. The duct 43 supplies room air at approximately 270 degrees Fahrenheit to the return air plenum or duct 44 which terminates at the central hot air furnace 45. The furnace 45 is provided with a blower (not shown) and heats the air received and supplies it in the supply duct 46 to the rooms to be heated. An air conditioning coil 47 is shown connected into the supply duct 46, but is not used during the heat season. After supplying the heated air to the rooms, the individual return ducts from the rooms are connected back into the return air plenum 44 and since there is a negative pressure provided at the central heating system 45 no additional fan is needed to pull this return air back to the central air furnace. The furnace blower is preferably on when fireplace 50 is on.

In order to supply the necessary make-up air or quality replacement air for the home, a remote air pump 48 is shown connected to an outside source of fresh air. In the preferred embodiment, the remote air pump 48 is located in a basement area. Basement air and the fresh air enter the return 44 and do not overly cool any particular isolated room. In this embodiment, the fresh air in a tight home is circulated through the duct system to the individual rooms and is preheated with the air in the return duct 44. Further, the outside fresh air that is passed into the room in which the fireplace 50 is located passes through the heat exchanger 14, 15 and is heated before it passes into duct 43 and the return air plenum duct 44. Since the remote air pump 48 can produce a positive pressure in a tightly sealed house, it is preferred that a bleeder 49 be located at an area completely remote from the air pump to relieve this positive pressure inside of the house.

Figure 6:
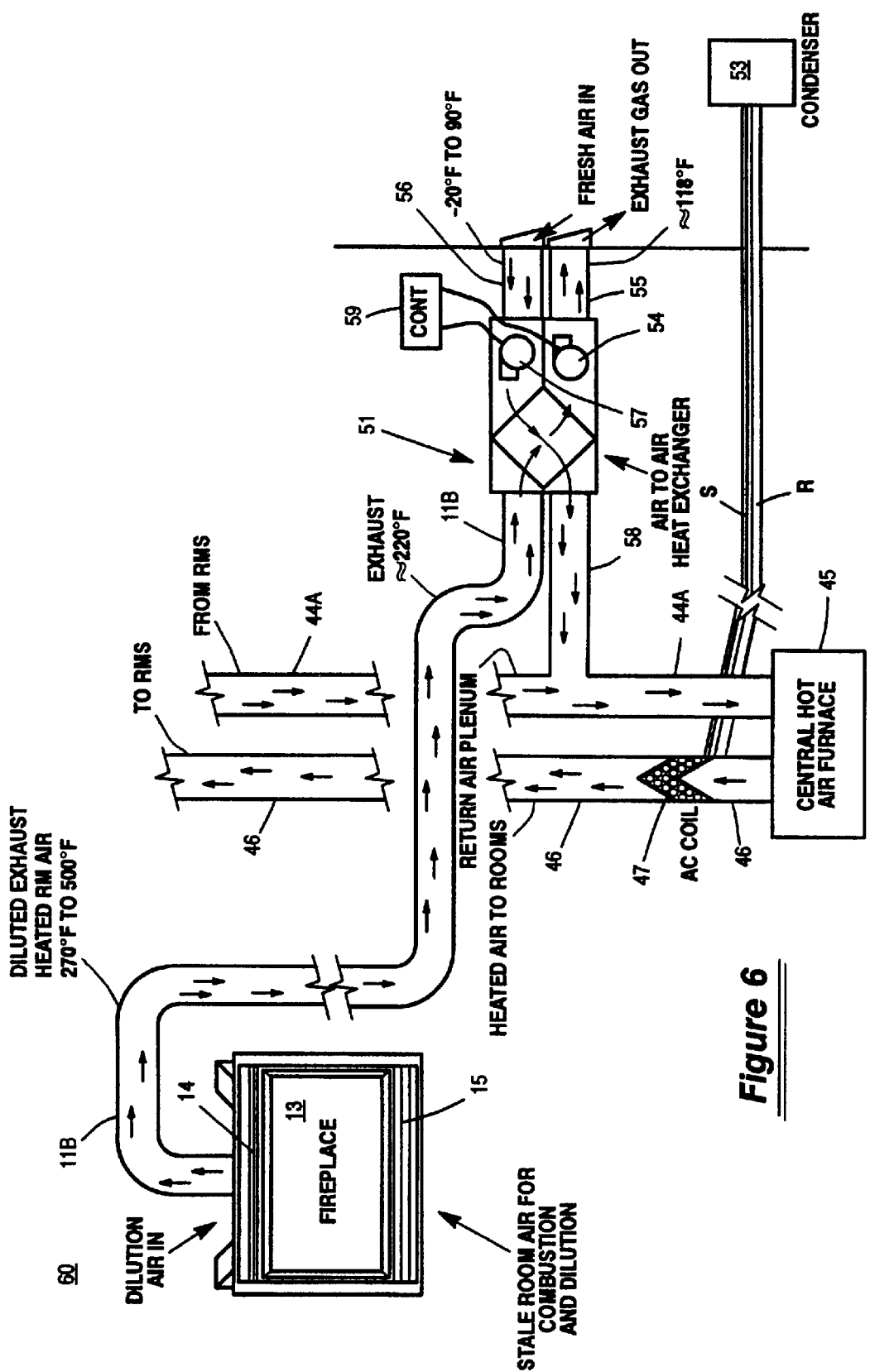
FIG. 6 is a diagrammatic drawing in elevation of a draft-assisted or power-vented direct-vented fireplace adapted to use room air for combustion and to dilute the exhaust gases.

Referring to FIG. 6, a diagrammatic drawing in elevation of a draft assist or power vent direct-vented fireplace 60 adapted to use room air for combustion and for dilution of exhaust gases which in turn are passed through a novel heat exchanger is shown. The fireplace 60, like fireplace 30, has a heat exchanger with two inlets 14 and 15. The bottom grill 15 supplies stale room air for combustion in combustion chamber 13 as well as dilution of the exhaust gases. The inlet 14 supplies room air for dilution of the mixed exhaust gases which pass into the exhaust duct 11B at approximately 270 to 500 degrees Fahrenheit, depending on the amount of excess combustion air and dilution supplied in inlets 14 and 15. As will be explained later, this amount of dilution may be controlled in a tight house. The exhaust gases in exhaust duct 11B are cooled to approximately no more than 220 degrees Fahrenheit before being passed into a novel cross flow air-to-air heat exchanger 51. The arrows in the heat exchanger show the exhaust gases pass diagonally into in-line blower 54 and force the cooled exhaust gases out of duct 55 at approximately 118 degrees Fahrenheit. There is shown a fresh air intake duct for outside air 56 supplying air into the heat exchanger 51 via in-line blower 57 which forces the preheated outside air into duct 58 which is connected to the aforementioned plenum 44A that serves as the supply return to the central hot air furnace 45. The furnace 45 has its own blower and heats the air which is supplied to supply duct 46 through air conditioning coil 47 into the previously explained supply duct 46. The air conditioning system 53 is shown having a supply S and a return R even though the air conditioning coils 47 are not cooled during the heating season. The novel heat exchanger 51 is preferably made from a high heat conductivity metal such as aluminum and comprises a plurality of spaced plates sealed one from another to permit an efficient cross flow heat exchanger. Such heat exchangers made of aluminum are capable of operation as high as 500+ degrees Fahrenheit in the preferred embodiment.

In this embodiment, a controller 59 preferably is capable of operating the blower motors 57 and 54 at predetermined speeds to achieve predetermined desired cubic foot displacements of make-up air and exhaust air in the system. For example, if motor 54 is run at a slower speed the exhaust gases in exhaust stack 11B increase in temperature. The exhaust motor 54 only needs to be operated to a speed which exhausts the desired amount of make-up air plus combustion air into the system. Similarly, the blower motor 57 only needs to supply the amount of fresh air needed for combustion and make-up. It is not intended that motors 54 and 57 be operated at variable speeds over a long period of time. It is preferred that the motors be set to operate at desired displacement speeds when the fireplace 60 is on and the blower in central air furnace 45 may be operated independently of the make-up system which passes through the fireplace.

Figure 7:
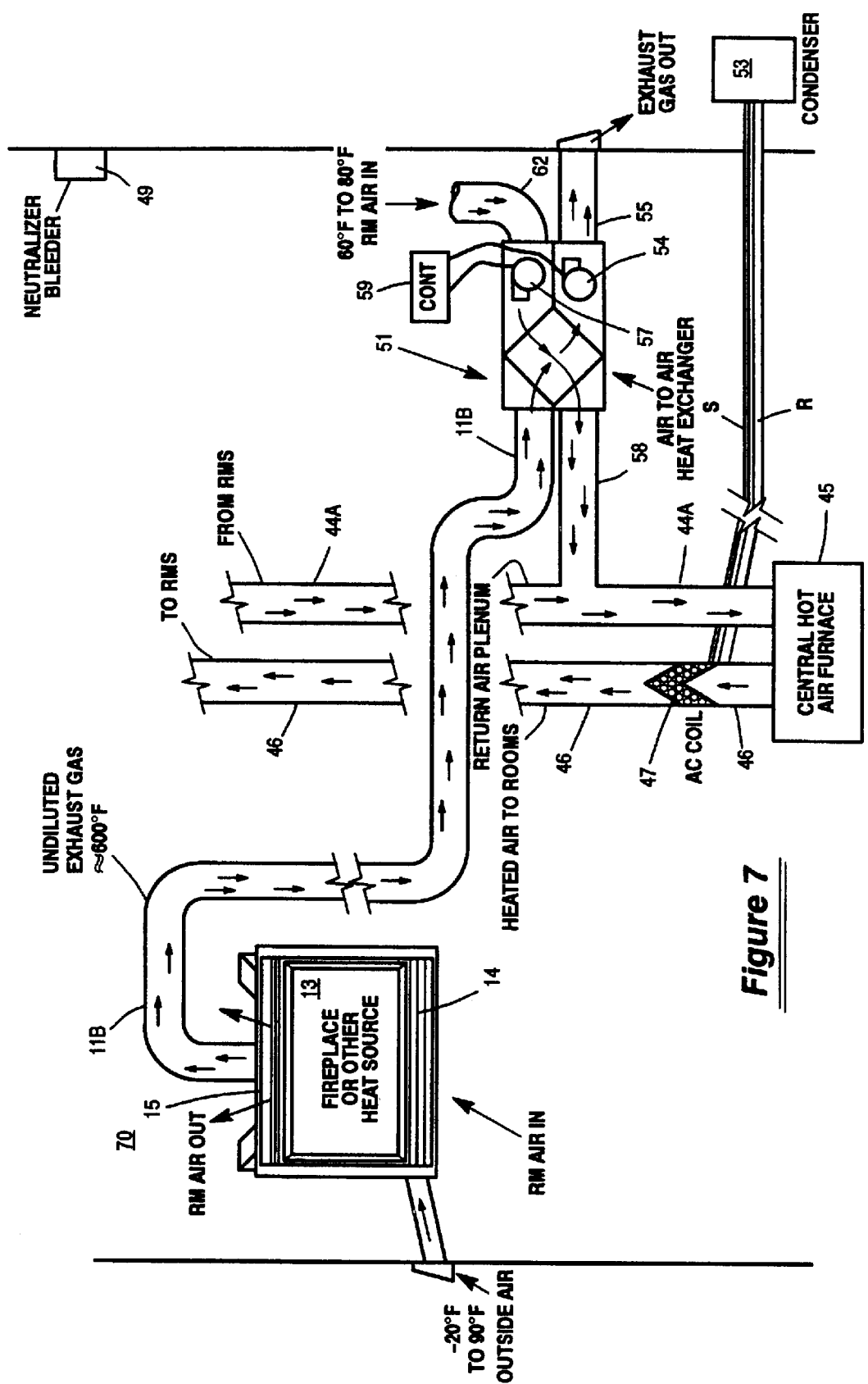
FIG. 7 is a diagrammatic drawing in elevation of a co-linear fireplace adapted to pass its hot exhaust gases through a remote heat exchanger used to heat room air in a house as it passes into the return air duct of a central heating system.

Referring to FIG. 7, a diagrammatic drawing in elevation of a co-linear fireplace 70 adapted to pass its exhaust gases through the aforementioned novel air-to-air cross flow heat exchanger 51 is shown. When the fireplace 70 is on, it takes outside fresh air in through duct 61 and burns the air in the combustion chamber 13 and passes the undiluted exhaust gas into exhaust duct 11B at approximately 600 degrees Fahrenheit where it cools on its passageway to the novel cross flow heat exchanger 51. The exhaust gases pass through the in-line blower 54 and are exhausted through exhaust duct 55 to the outside. In this embodiment, the blower 57 sucks in air from the house at 60 to 80 degrees Fahrenheit and passes it into the return duct 58 after being preheated in the heat exchanger 51. The preheated house air is passed into the central hot air furnace 45 where it is heated again and forced into the supply duct 46 through air conditioning coils 47 and into the rooms.

In one embodiment of this invention, it may be possible to control the blower motor 57 in a manner where it creates a negative pressure in a room or area in which it is located so that either the bleeder 49 or leaks in a loose house supply the sufficient make-up air desired for air quality. However, if the house is new and of tight construction it could be necessary to place a remote heat pump in the system as shown and described in FIGS. 4 and 5 in order to supply the deficiency of make-up air for quality air conditions. Blower 54 acts to induce outside combustion air into combustion chamber 13.

Figure 8:
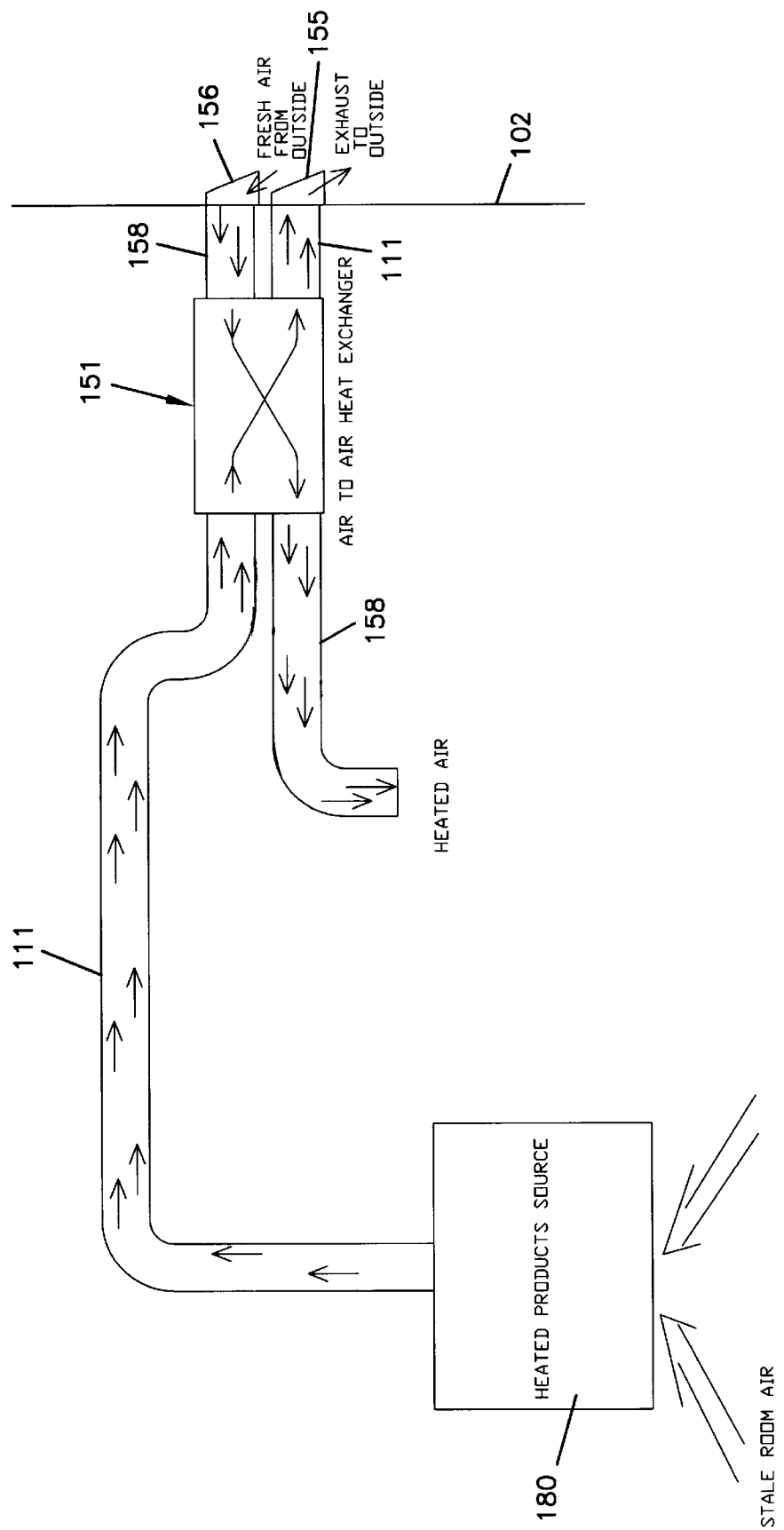
FIG. 8 is a diagrammatic drawing in elevation of a heat exchange system adapted to use heated waste combustion products to heat outside air being brought into a structure.

Referring to FIG. 8, a diagrammatic drawing in elevation of an embodiment of a heat exchange system 100 used to heat combustion waste products is shown. The heat exchange system 100 can be used in any structure, such as residential, commercial, and industrial buildings.

The heat exchange system 100 includes a heated products source 180, an exhaust duct 111, an intake duct 158, and a heat exchanger 151. The heated products source 180, such as an appliance, can generate waste gases and particulates upon combustion of gas/air mixtures or from burning fuels such as wood. Examples of waste products include carbon dioxide, carbon monoxide, excess heat, particulates such as smoke, as well as any other unwanted product of combustion. The heated products source uses stale room air for combustion. Examples of gas and electric appliances that generate heated waste products include, but are not limited to, furnaces, hot water heaters, clothes dryers, stoves, and fireplaces.

As shown in FIG. 8, the heated products source generates waste exhaust gases (indicated with arrows) that pass into the exhaust duct 111 and travel through the heat exchanger 151 before exiting an outer wall 102 of the structure through an exhaust duct outlet 155. Alternatively, the heat exchanger can be located outside the outer wall of the structure.

The fresh outside air enters the structure through an intake duct inlet 156, which then passes through the intake duct 158. The intake duct 158 supplies fresh or make-up air to the structure which passes the outside air through the heat exchanger 151 where it is heated. After passing through the heat exchanger 151, the heated outside air continues to travel through the intake duct 158. The intake duct 158 can be connected, for example, to additional ductwork, to appliances, or can act as a heat dump within the structure. Optionally, when acting as a heat dump, the portion of the intake duct that extends from the heat exchanger and contains the heated outside air can be removed such that the heated outside air is delivered into the structure directly from the heat exchanger.

FIG. 8 shows the exhaust duct 111 coupled directly to the heated products source 180. Alternatively, the exhaust duct can be positioned away from the heated products source and collect waste products with, for example, a kitchen stove hood attachment that acts to couple the heated products source and exhaust duct. In other applications, the exhaust duct can be contained entirely within the heat exchanger. For example, a heat exchanger defining an exhaust opening can be coupled to a ceiling or roof of a structure. The waste products can rise or be drawn to and enter the exhaust duct located within the heat exchanger through the exhaust opening. As the waste products pass through the exhaust duct, heat is transferred to fresh outside air entering the structure.

Stale room air used for heated products source 180 combustion, to balance the pressure within the structure, and/or for exchange with fresh outside air can be drawn into the heated product source 180 through vents or openings within the structure of the heated products source. The stale air can be drawn into the heated products source by, for example, pressure differentials or through in-line blowers. In some appliances, the heated products source may not require stale room for combustion. For example, heated products sources, such as electric stoves and clothes dryers, do not combust gas/air mixtures and the stale room air is used only to balance pressure and exchange the stale air with fresh air.

Figure 10:
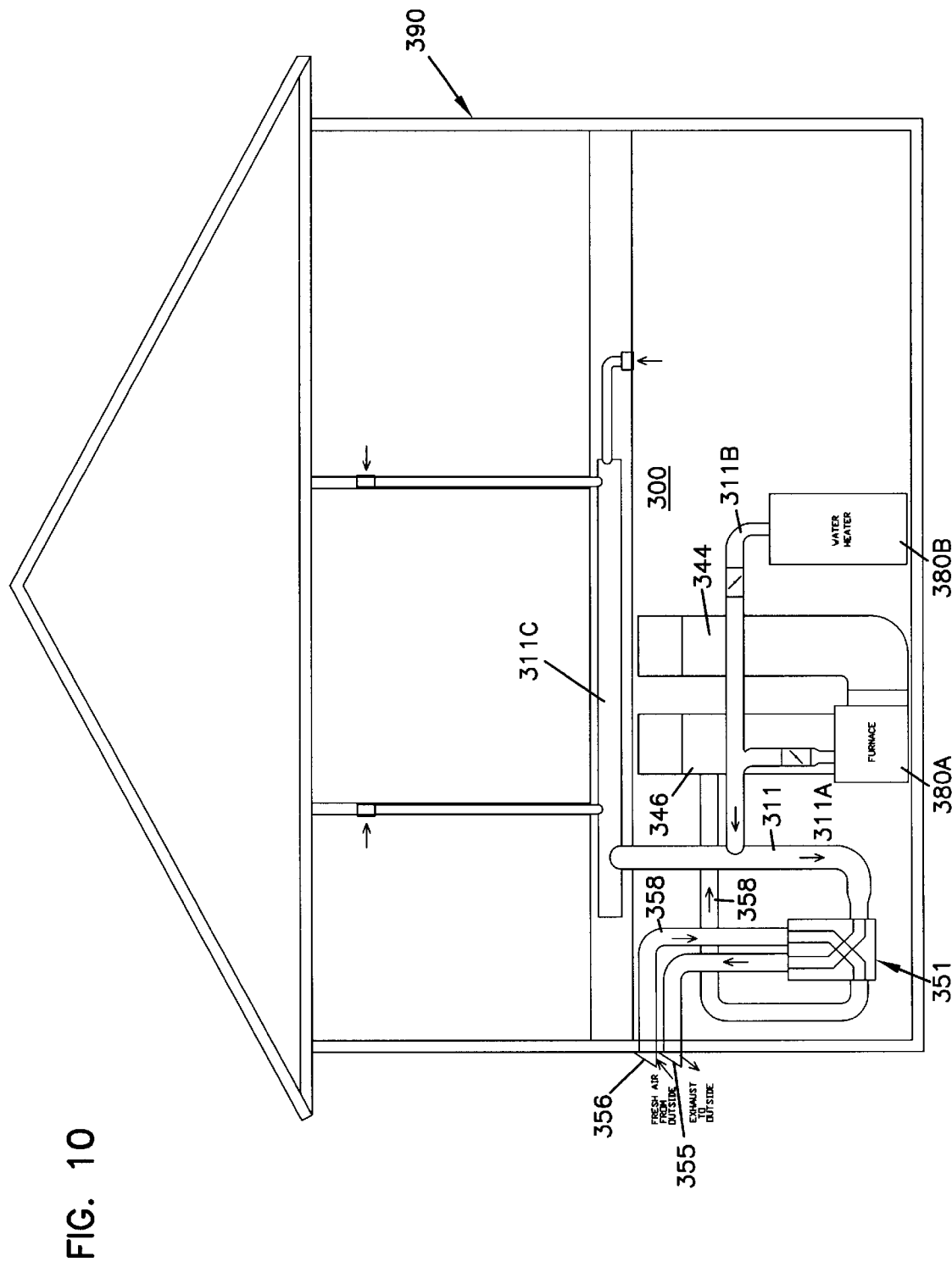
FIG. 10 is a diagrammatic drawing in elevation of a heat exchange system in operation in a home having multiple heated products sources.

Alternatively, more than one heated product source can be employed within the structure. Waste gases from each of the heated product sources can be passed into a common exhaust duct, as shown in FIG. 10 and hereinafter described in greater detail. A common exhaust duct reduces the number of exhaust outlets that need to be cut through the outer wall of the structure.

Figure 9:
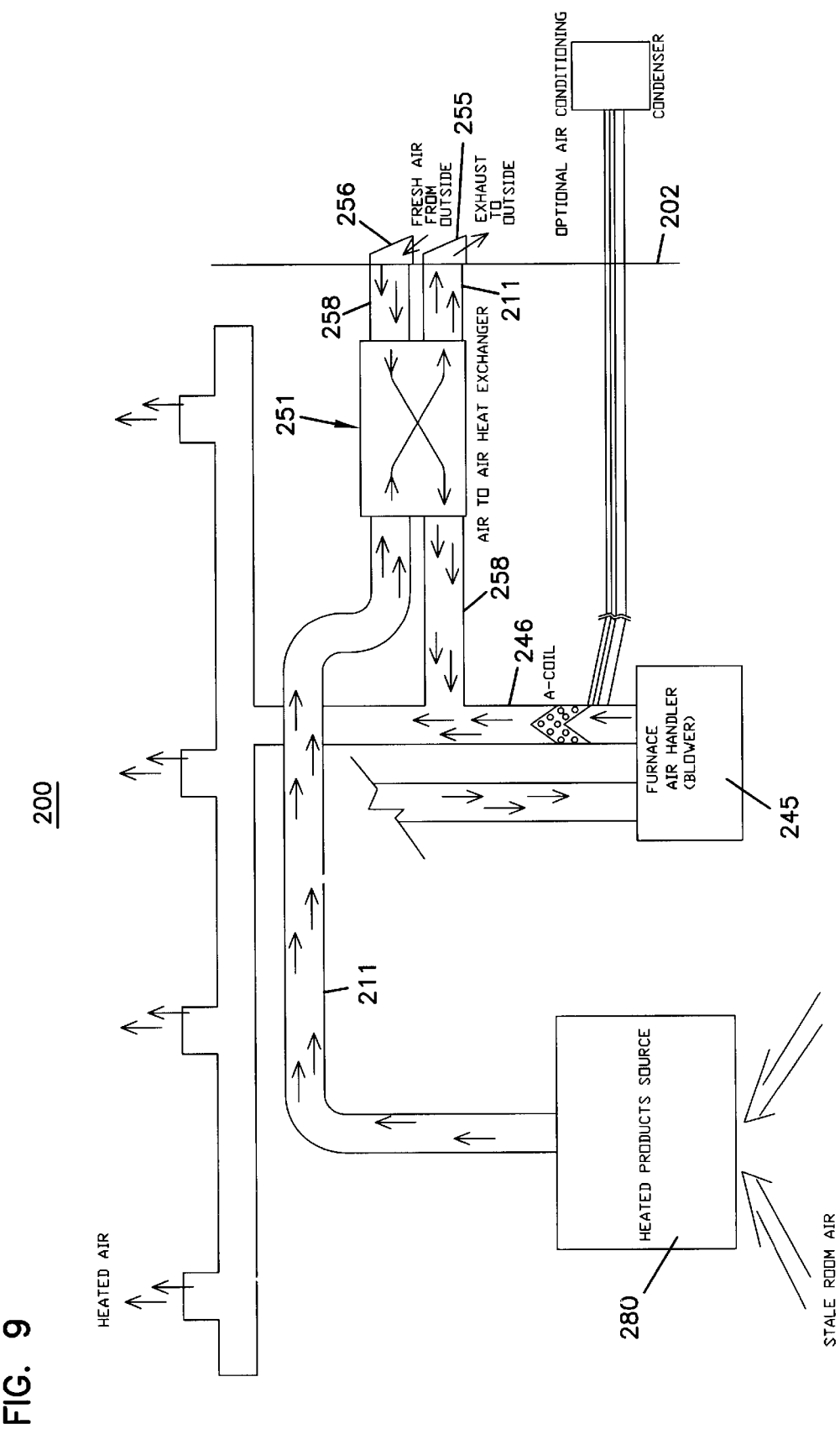
FIG. 9 is a diagrammatic drawing in elevation of a heat exchange system adapted to use heated waste combustion products to heat outside air being brought into a furnace supply duct of a structure.

Referring to FIG. 9, a diagrammatic drawing in elevation of another embodiment of a heat exchange system 200 is shown. The heat exchange system includes a heated products source 280, a furnace 245 having an optional air handler, an exhaust duct 211, an intake duct 258, a room supply duct 246, and a heat exchanger 251. Fresh outside air passes into the intake duct 258 through an intake duct inlet 256. The fresh air travels through the heat exchanger 251 and into a room supply duct 246 that is connected to furnace 245 as the heated outlet thereof and provides heated air to the structure. The outside air is heated within the heat exchanger 251 from the heat carried by waste products generated by the heated products source 280. The waste products pass from the heated products source 280 into the exhaust duct 211, through the heat exchanger 251, where heat exchange occurs with the outside air, and exit the structure out the exhaust duct outlet 255.

Referring to FIG. 10, a diagrammatic drawing in elevation of another embodiment of a heat exchange system 300 having multiple heated product sources 380A and 380B is shown. Other embodiments can include any number of heated product sources. The heat exchange system 300 is shown located in a house 390, but can be used in other structures as well. As shown in FIG. 10, one heated products source is a furnace 380A and the other is hot water heater 380B. Alternatively, the heated product sources can be any other appliance that is used with the structure. Each heated product source can include exhaust ducts 311A and 311B, which are coupled to a common exhaust duct 311. Optionally, the common exhaust duct 311 can be connected to receive stale air from a room air exhaust duct 311C, which can be exhausted from the structure. Alternatively, the room air exhaust duct 311C can be connected back to the furnace as return ducts and into a return air plenum 344. The common exhaust duct 311 passes through a heat exchanger 351 where it transfers heat to the fresh outside air passing through an intake duct 358. The waste products are then exhausted from the structure out an exhaust duct outlet 355. The outside air is supplied to the structure and the intake duct 358 through intake duct inlet 356. After heat exchange, the heated outside air passes into a heated air supply duct 346 of the furnace 380A for distribution to the structure. Alternatively, the heated outside air can be passed from the intake duct 358 into the return air plenum 344.

The heat exchangers 151, 251, and 351, shown in FIGS. 8–10, are preferably air-to-air exchangers made of the materials and constructed as described for the heat exchanger 51 of FIG. 6. The heat exchangers 151, 251, and 351 can be a single, double, or multiple pass system to maximize heat transfer and efficiency. Optionally the heat exchange systems 100, 200, and 300, shown in FIGS. 8–10, can include one or multiple in-line blowers and a controller that are incorporated into the heat exchange system as was described for the embodiment shown in FIG. 6. Alternatively, the in-line blowers can be housed outside of the heat exchanger. The optional in-line blowers and controller can regulate outside air being brought into the structure through the intake duct and force exhaust gases out of the structure. Preferably, a negative pressure is maintained on the exhaust side of the heat exchanger, which prohibits waste products from being drawn into the intake duct located within the heat exchanger if a leak should occur.

The heat exchanger can be constructed for use in any size structure. For example, a heat exchanger can be made that provides sufficient heat exchange for a house. In another application, a larger heat exchanger can be constructed to provide, for example, heat exchange in a large industrial factory that generates significant excess heat during manufacturing.

Having explained embodiments of the present invention and modifications thereof, it will be understood that presently designed and manufactured high production fireplaces may, for example, be coupled into existing heating systems in homes that have forced air furnaces so as to create not only an efficient heating system, but a system which supplies make-up air for a quality air system in a very efficient manner. Embodiments of the present invention can be provided with variable speed motors and controls which allow the installers of such systems to use universal equipment to achieve precise and exacting predetermined standards for different types of structures, for example, houses, made to different tightnesses and specifications. Thus, the present invention permits a builder of houses to select universal components that are produced at high efficiency and low cost for installation without having to engineer and manufacture a custom system.

Having explained the problem of maintaining heat efficiency in tight structures, such as houses, having hot air fireplaces and hot air furnaces, it will be appreciated that the introduction of a required amount of cold outside air to maintain air quality can decidedly reduce the heat efficiency of the fireplace and/or the heating system. Accordingly, there is provided a high efficiency heat exchange system that preheats the fresh air using the hot exhaust gas from a gas fireplace and/or the fireplace heat exchanger and/or other heated product sources to preheat the air without unbalancing the temperature of the rooms or the system. The outside fresh air is preheated in a manner which will permit easy modification of existing fireplace/furnace systems as well as the installation of the present novel system in new homes.

What is claimed is:

1. A heat exchange system for heating outside air provided to a structure, comprising:

an exhaust duct to remove heated exhaust products from the structure, wherein the heated exhaust products are generated by a heated products source;

an intake duct to supply outside air to the structure; and a heat exchanger coupled to the heated products source through the exhaust duct and coupled to the outside air through the intake duct, wherein the exhaust duct and the intake duct pass through the heat exchanger to transfer heat from the heated exhaust products to the outside air.

2. The heat exchange system of claim 1, wherein the heated products source comprises an appliance.

3. The heat exchange system of claim 1, further comprising an intake duct in-line blower housed in the intake duct to regulate outside air intake into the structure.

4. The heat exchange system of claim 1, further comprising an exhaust duct in-line blower housed in the exhaust duct to regulate the removal of heated exhaust products from the structure.

5. The heat exchange system of claim 1, further comprising a controller to regulate the supply of outside air to the structure.

6. The heat exchange system of claim 1, further comprising a controller to regulate the removal of heated exhaust air from the structure.

7. The heat exchange system of claim 1, further comprising a controller and a pair of in-line blowers to regulate air pressure within the structure, wherein the controller independently controls each of the in-line blowers.

8. The heat exchange system of claim 1, wherein the heat exchange system is housed within the structure.

9. The heat exchange system of claim 1, wherein the structure is a home.

10. A heat exchange system for heating outside air provided to a structure, comprising:

an exhaust duct to remove heated exhaust products from the structure, wherein the heated waste products are generated by a heated products source;

an intake duct to supply outside air to the structure; and a heat exchanger coupling the exhaust duct and the intake duct to transfer heat from the heated exhaust products to the outside air, wherein the heat exchanger is coupled to the heated products source through the intake duct and the exhaust duct and the heat exchanger is provided in a remote location from the heated products source.

11. The heat exchange system of claim 10, further comprising a controller and a pair of in-line blowers coupled to the heat exchanger to regulate air quality within the structure, wherein the controller independently controls each of the in-line blowers.

12. The heat exchange system of claim 1, wherein the exhaust duct is a common exhaust duct to remove the heated exhaust products from the structure, wherein the heated exhaust products are generated by the heated products source and one or more additional heated products sources.

13. A method of heating outside air supplied to a structure comprising the steps of:

generating heated exhaust products of combustion from a heated products source;

passing the heated exhaust products from the heated products source into an exhaust duct;

conducting the heated exhaust products within the exhaust duct and through a heat exchanger prior to exhaustion of the heated exhaust products from the structure, wherein the heat exchanger is provided in a location remote from the heated products source;

passing outside air into an intake duct to supply the outside air to the structure;

conducting the outside air within the intake duct and through the heat exchanger prior to supplying the structure with the outside air;

passing the intake duct and the exhaust duct through the heat exchanger; and coupling the intake duct and the exhaust duct within the heat exchanger to transfer heat from the heated exhaust products to the outside air.

14. The method of claim 13, further comprising the step of exhausting the heated exhaust products from the structure.

15. The method of claim 13, further comprising the step of moving the heated exhaust products with an exhaust duct in-line blower.

16. The method of claim 13, further comprising the step of moving the outside air with an intake duct in-line blower.

17. The method of claim 13, further comprising the step of supplying heated outside air to the structure.

18. The method of claim 13, further comprising the step of regulating the pressure within the structure with a pair of in-line blowers housed within the intake duct and the exhaust duct.

19. The method of claim 13, wherein the step of regulating the pressure within a structure further comprises controlling the pair of in-line blowers with a controller.

* * * * *